United States Patent
Beattie et al.

(10) Patent No.: US 9,561,775 B2
(45) Date of Patent: Feb. 7, 2017

(54) AIRBAG WITH MULTI-STATE VENT

(71) Applicant: Key Safety Systems, Inc., Sterling Heights, MI (US)

(72) Inventors: Calum Beattie, Rochester Hills, MI (US); Heather Mallinger, Washington, MI (US); Mary Raska, Romeo, MI (US); Soonsik Kim, Rochester Hills, MI (US)

(73) Assignee: Key Safety Systems, Inc., Sterling Heights, MI (US)

( * ) Notice: Subject to any disclaimer, the term of this patent is extended or adjusted under 35 U.S.C. 154(b) by 131 days.

(21) Appl. No.: 14/379,678

(22) PCT Filed: Mar. 18, 2013

(86) PCT No.: PCT/US2013/032804
§ 371 (c)(1),
(2) Date: Aug. 19, 2014

(87) PCT Pub. No.: WO2013/126929
PCT Pub. Date: Aug. 29, 2013

(65) Prior Publication Data
US 2016/0068132 A1    Mar. 10, 2016

Related U.S. Application Data

(60) Provisional application No. 61/602,359, filed on Feb. 23, 2012.

(51) Int. Cl.
*B60R 21/2338* (2011.01)
*B60R 21/239* (2006.01)

(52) U.S. Cl.
CPC ......... *B60R 21/239* (2013.01); *B60R 21/2338* (2013.01); *B60R 2021/2395* (2013.01); *B60R 2021/23382* (2013.01)

(58) Field of Classification Search
CPC ............... B60R 21/2338; B60R 21/239; B60R 2021/23382; B60R 2021/2395
See application file for complete search history.

(56) References Cited

U.S. PATENT DOCUMENTS

| 5,246,250 | A | * | 9/1993 | Wolanin | B60R 21/239 251/294 |
| 5,333,903 | A | | 8/1994 | Eyrainer | |
| 5,492,363 | A | * | 2/1996 | Hartmeyer | B60R 21/239 280/738 |
| 5,603,526 | A | | 2/1997 | Buchananan | |
| 6,648,371 | B2 | * | 11/2003 | Vendely | B60R 21/217 280/739 |

(Continued)

FOREIGN PATENT DOCUMENTS

| EP | 2113430 A1 | 11/2009 |
| KR | 10-2009-0026413 A | 3/2009 |

(Continued)

*Primary Examiner* — Laura Freedman
(74) *Attorney, Agent, or Firm* — Markell Seitzman

(57) ABSTRACT

An air bag having a tri-state vent, in an initial state the vent is configured to be closed, the vent in a medial state configured to be at least partially open or fully open as the air bag is starting to inflate permitting some inflator gas to exit through the vent and the vent in a final state configured to be at least partially closed or fully closed as the air bag continues to inflate.

18 Claims, 6 Drawing Sheets

(56) References Cited

U.S. PATENT DOCUMENTS

| | | | |
|---|---|---|---|
| 6,659,499 B2* | 12/2003 | Jenkins | B60R 21/2338 280/735 |
| 6,773,030 B2* | 8/2004 | Fischer | B60R 21/233 280/739 |
| 7,237,802 B2* | 7/2007 | Rose | B60R 21/2338 280/743.1 |
| 7,458,607 B2* | 12/2008 | Abe | B60R 21/233 280/739 |
| 7,475,906 B2* | 1/2009 | Goto | B60R 21/2338 280/738 |
| 7,568,729 B2* | 8/2009 | Schnieder | B60R 21/2338 280/736 |
| 7,722,080 B2* | 5/2010 | Rose | B60R 21/2338 280/743.2 |
| 7,770,926 B2* | 8/2010 | Schneider | B60R 21/2338 280/739 |
| 7,845,678 B2* | 12/2010 | Pausch | B60R 21/2338 280/735 |
| 7,980,592 B2* | 7/2011 | Fischer | B60R 21/231 280/730.1 |
| 8,020,889 B2* | 9/2011 | Bauer | B60R 21/233 280/739 |
| 8,070,183 B2* | 12/2011 | Kumagai | B60R 21/2338 280/732 |
| 8,226,118 B2* | 7/2012 | Rose | B60R 21/2338 280/743.2 |
| 2009/0289444 A1* | 11/2009 | Keshavaraj | B60R 21/2338 280/736 |
| 2011/0025033 A1 | 2/2011 | Bradburn | |

FOREIGN PATENT DOCUMENTS

| | | |
|---|---|---|
| WO | 2006121383 A1 | 11/2006 |
| WO | 2008/039109 A1 | 4/2008 |

* cited by examiner

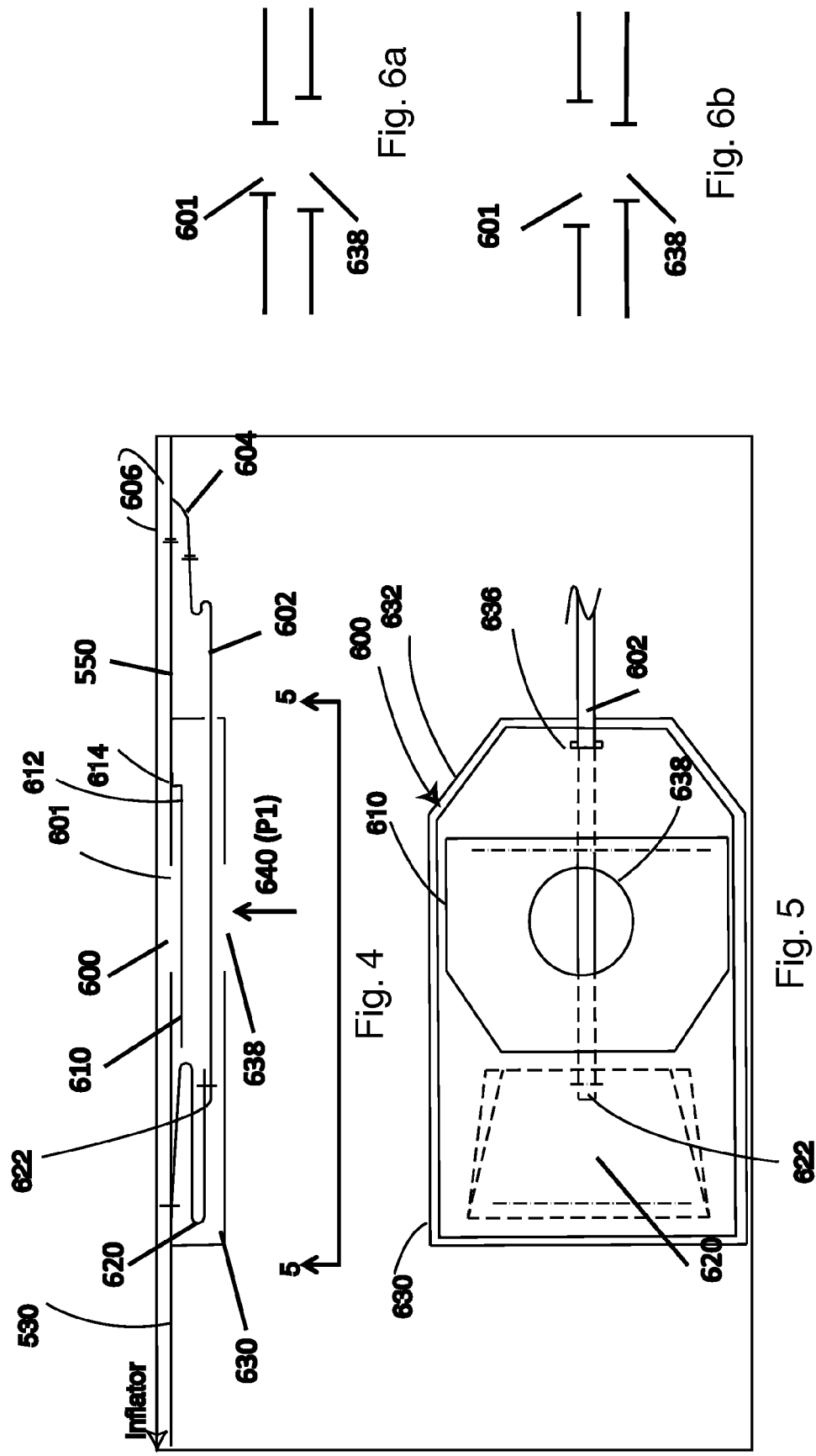

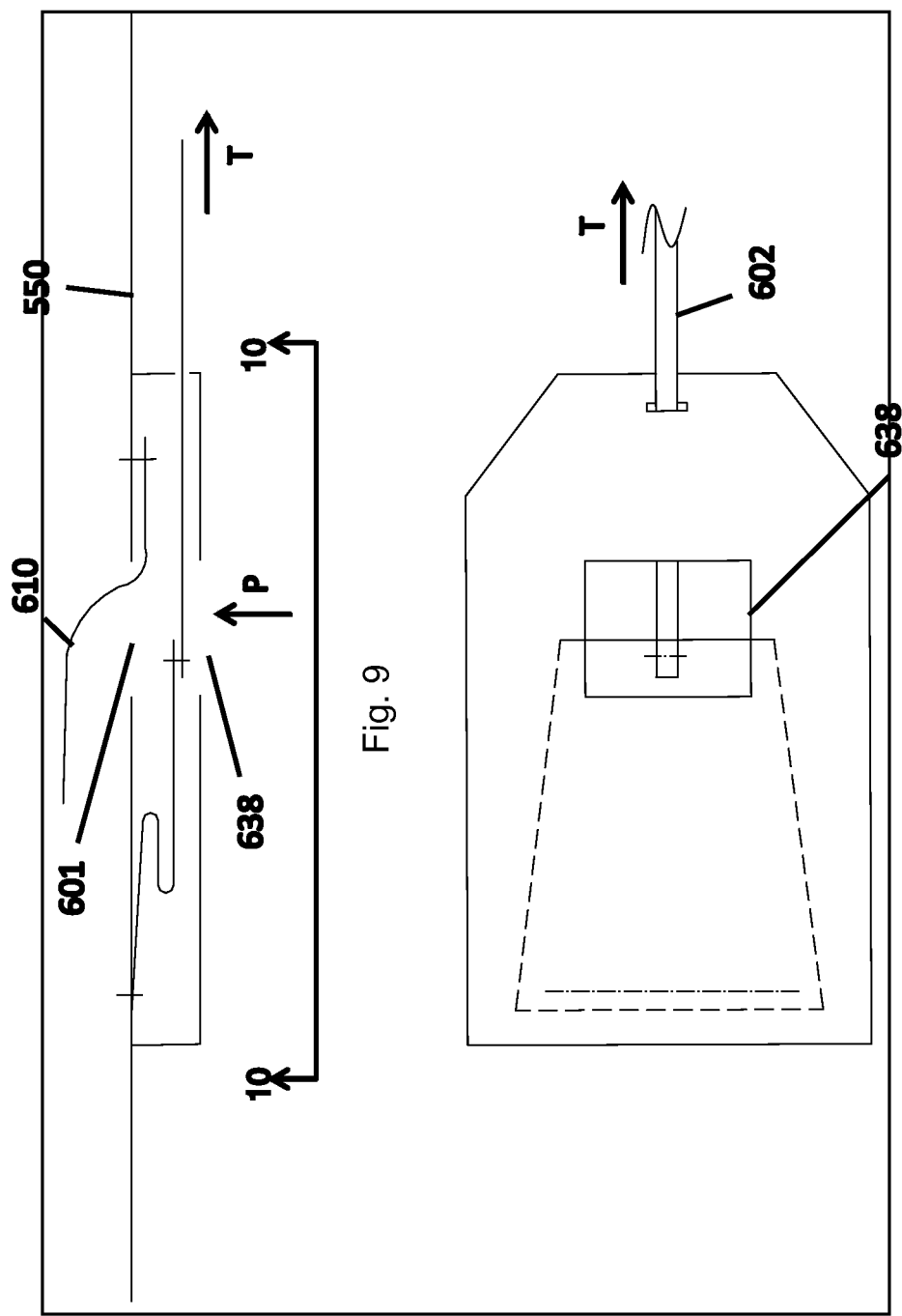

AIRBAG WITH MULTI-STATE VENT

BACKGROUND AND SUMMARY OF THE INVENTION

The present invention relates to airbags with venting mechanisms and more particularly with the airbag having a tri-state vent mechanism.

The present invention includes, an air bag having a tri-state vent, in an initial state the vent is configured to be closed, the vent in a medial state configured to be at least partially open or fully open as the air bag is starting to inflate, permitting some inflator gas to exit through the vent, and the vent in a final state configured to be at least partially closed or fully closed as the air bag continues to inflate,

BRIEF DESCRIPTION OF THE DRAWINGS

FIG. 4 is a cross-sectional view showing the major elements of the valve mechanism.

FIG. 5 is a plan view of the valve mechanism viewed from the interior of the air bag looking outwardly.

FIG. 6a and FIG. 6b illustrate parameters of the effective mechanism.

FIGS. 9 and 10 show the vent mechanism in a partially closed condition.

DETAILED DESCRIPTION OF THE DRAWINGS

Figure 1:
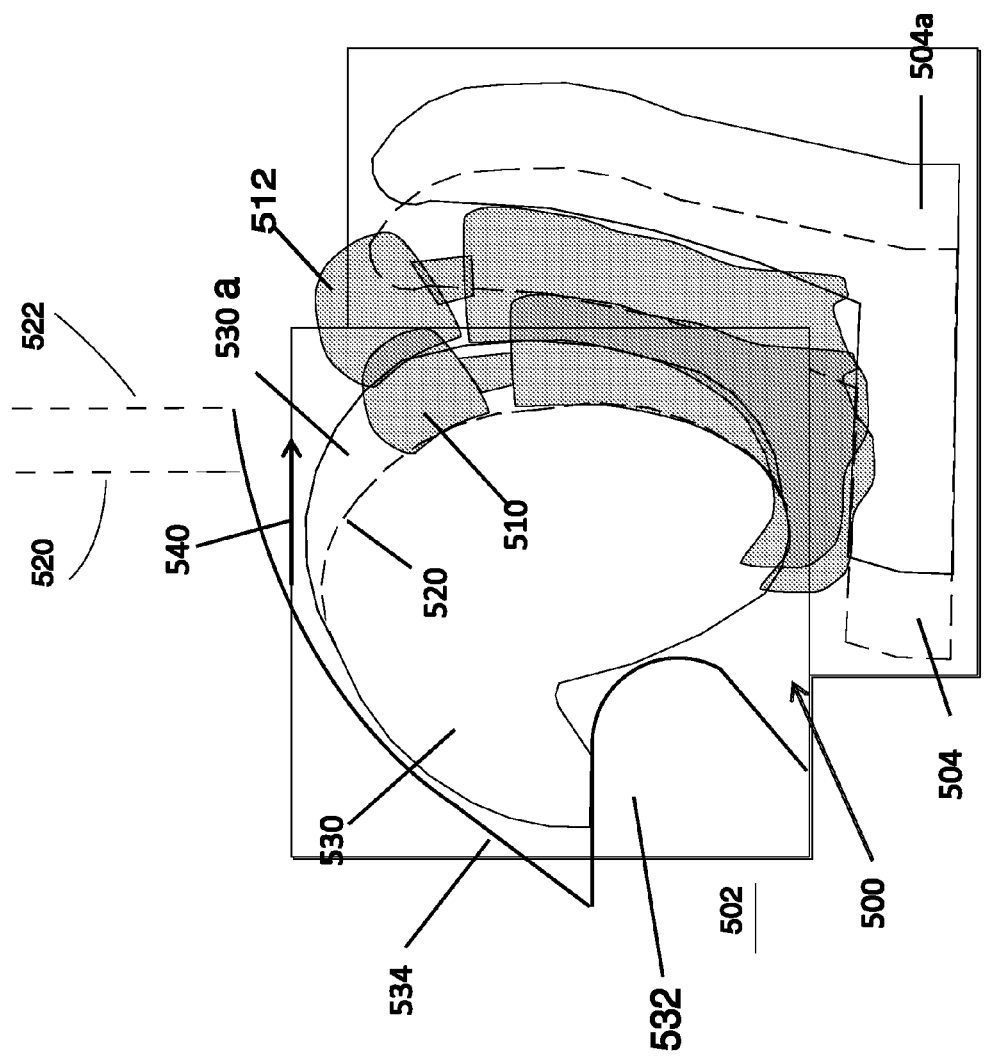
FIG. 1 diagrammatically illustrates a portion of the passenger compartment of the vehicle and illustrates typical seating positions of the small and large occupant.

FIG. 1 illustrates a portion of a typical passenger compartment 500 of a vehicle 502. A vehicle seat 504 is shown in a forward seating position and a rearward seating position 504a. An occupant 510 of a small stature, such as a 5th percentile female, is shown seated upon seat 504 in the forward position. A relatively larger occupant 512 such as a 50th percentile or 95th percentile male is shown seated upon the vehicle seat in its rearward position. Dotted line 520 illustrates a plane of contact between airbag 530 and occupant 510 while dotted line 522 is illustrative of a plane of contact 522 between airbag 530 and the larger occupant 512. In the example of FIG. 1 the airbag is located in a portion of the instrument panel 532 and when inflated may react against the vehicle windshield 534 and then move toward the occupant to be protected. Arrow 540 illustrates the direction of expansion of the airbag 530, dotted line 530a shows the airbag in a more inflated condition, protecting the larger sized occupant 512 in the presumed rearward seating position.

Figure 2:
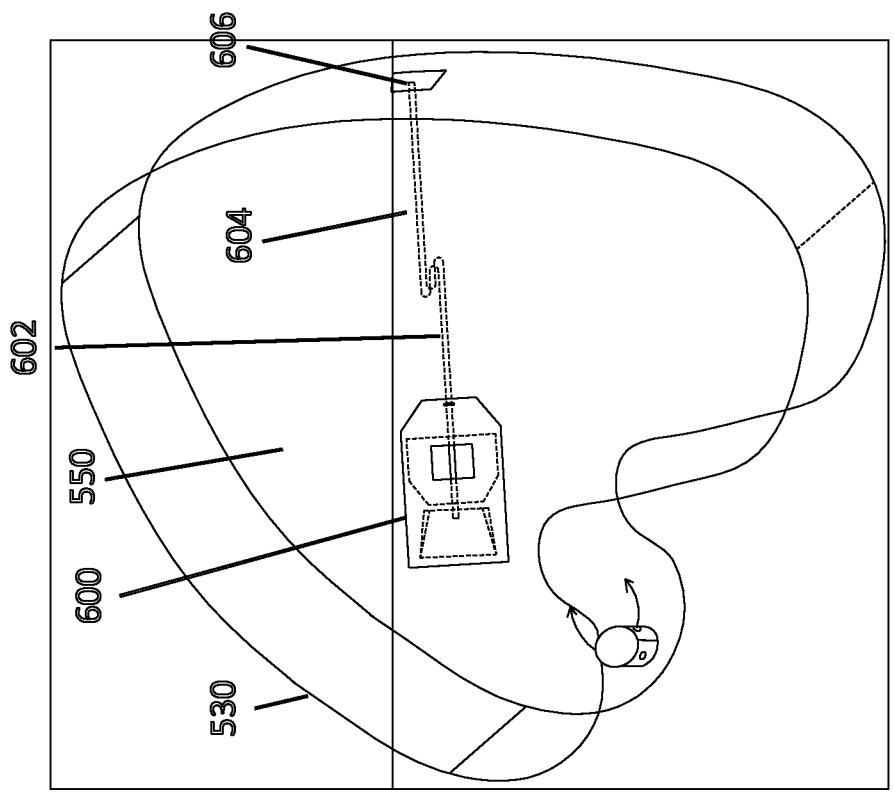
FIG. 2 illustrates the placement of a valve mechanism using the present invention relative to the other portions of an air bag.

Reference is briefly made to FIG. 2 which shows airbag 530 in the partially inflated condition. Vent mechanism 600 can be located on any surface of the air bag; in the illustrated embodiment, the vent mechanism 600 is located on a side 550 of airbag 530. Other vent mechanisms may be positioned on the other regions of the air bag. Vent mechanism 600 includes a tether 602. The tether has an end 604 that is connected to region 606 of the air bag. This connection can be created using sewn stitches or a sonic weld or other similar method. As the air bag inflates, the tether moves with region 606 of the airbag and is pulled progressively taut which aids in the change of state of the vent mechanism 600.

Figure 3:
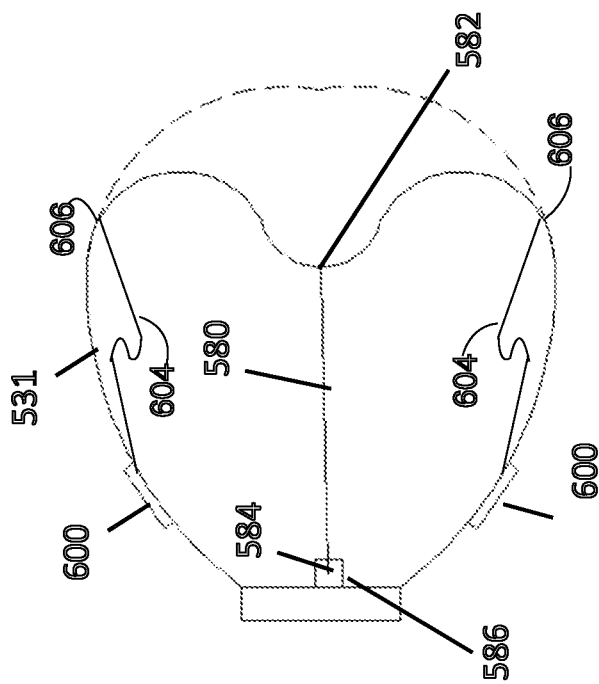
FIG. 3 diagrammatically illustrates the present valve mechanism can be used with dual depth airbags.

Reference is briefly made to FIG. 3 which shows a dual depth airbag 531. FIG. 3 shows the present vent mechanism 600 can also be used in airbags known as dual depth airbags. In this type of airbag an additional tether 580 is connected to a region such as 582 of the bag. A remote end 584 of the tether 580 is connected to a tether release mechanism 586. If the tether release mechanism maintains its hold on tether 580 the airbag is restricted in size. If on the other hand the tether release mechanism 586 releases tether 580 the airbag 531 is permitted to inflate fully to a larger size. The valve mechanism 600 of the present invention is shown at two locations on the airbag 531.

Reference is made to FIGS. 4 and 5 which show further features of valve mechanism 600. Valve mechanism 600 includes a portion of the side or side panel 550 of airbag 530. A first vent opening 601 is located on side panel 550. The flap 610 is positioned in a closing relation over to opening 601. A side 612 of flap 610 is secured to panel 550 such as by a sewn seam 614 or by some other method including adhesive, sonic welding or other similar method as is known in the art. Vent mechanism 600 further includes a sliding panel 620 which is shown, in FIGS. 4 and 5, in a folded or compact orientation such as a roll. Tether 602 is secured at location 622 to sliding panel 620. As mentioned above the other end of the tether 602 is connected to region 606 of the airbag panel 550. The sliding panel 620 and flap 610 are protected by a pocket or jacket 630. The pocket 630 includes multiple sides 632 and is sewn or otherwise peripherally attached to panel 550. FIG. 5 shows peripherally securing the pocket 630 to air bag panel 550. Pocket 630 includes a small opening 636 through which tether 602 extends. The pocket 630 includes a second vent opening which is in general in registration with the first vent opening 601. Opening 638 is generally the same size as opening 601, however opening 638 can be smaller or larger than opening 601 as generally illustrated in FIGS. 6a and 6b. It should be appreciated by those skilled in the art that each of the elements of the vent mechanism 600 would lie one on top of the other and the various spaces shown between each element 550, 601, 602, 620 and 630 in the figures are shown for the purpose of illustration. Additionally, various figures, again for the purpose of illustration, show the openings of the vent mechanism can be circular and rectangular.

Figure 7:
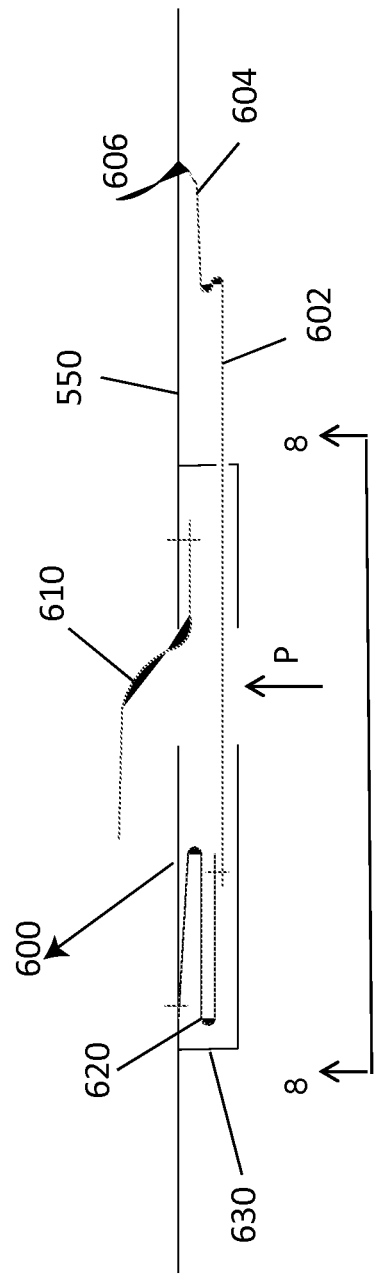
FIG. 7 illustrates a change of state of the vent mechanism from closed to open.
Figure 8:
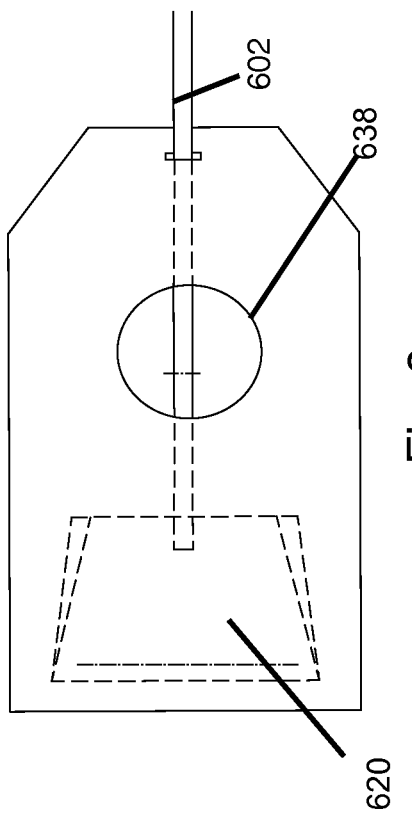
FIG. 8 shows another plan view of the vent mechanism.

When airbag 530 is folded, the components of vent mechanism 600 are in the condition as illustrated in FIG. 4 with the flap 610 closing the first vent opening 601. As the air bag becomes at least partially inflated to a size where the airbag approaches plane 520, which is illustrative of the smaller seated occupant, the interior of the air bag will be pressurized by the inflation gas received from the inflator X to a first pressure P1. The level of pressure P1 can be determined empirically or by measurement during development of the vent mechanism. FIG. 4 includes an arrow 640 which shows the direction of pressure P1. This pressure also acts across the total area of the pocket 630 with the exception of the area of opening 636. This pressure will act on the interior surface of flap 610, pushing the flap through opening 601 as illustrated in FIG. 7 and changing the state of the vent mechanism from closed to open. Reference is briefly made to FIG. 8 which is another plan view of the underside of vent mechanism 600. As can be seen in this state the sliding panel 620 has not moved to close opening 638. The tether 602 crosses openings 601 and 638.

Figure 11:
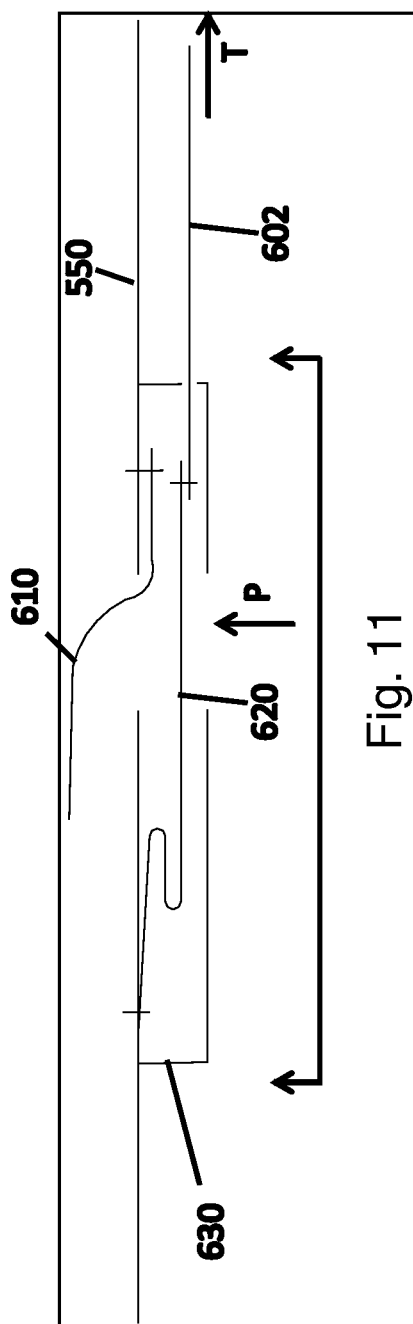
FIGS. 11 and 12 show the vent mechanism in a fully closed condition.
Figure 12:
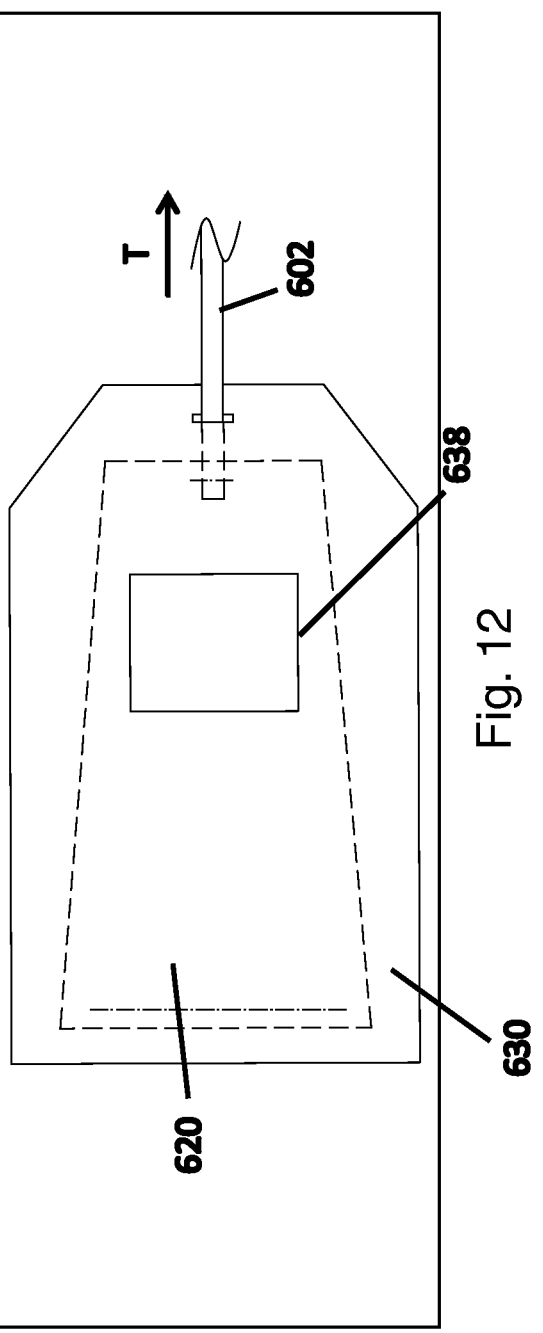

Reference is briefly made to FIG. 2. As the air bag continues to inflate in the direction toward the occupant, a tension T, in tether 602 increases to a level sufficient to begin to pull the sliding panel across opening 638. In FIG. 9 the tension, T, acting on tether 602 has pulled the sliding panel 620 partially across opening 638 to partially close openings 638 and 601. In this condition the amount of inflation gas that is permitted to exit vent opening 601 is reduced. This relationship is also shown in FIG. 10. As airbag 530 continues to inflate and moves toward plane 522 into a protective relationship with the occupant seated in the rearward seating position, the tension T acting on the tether pulls the sliding panel 630 fully across opening 638 to prevent further inflation gas from exiting vent hole 601, thereby closing the vent mechanism 600. Preferably, the length of tether 602 and the size and position of the sliding panel 620 are chosen so the vent mechanism 600 reaches the partially enclosed condition just after the airbag passes plane 520, that is just after the airbag is sufficiently inflated to protect the smaller occupant at the presumed seated location of the smaller occupant. FIGS. 11 and 12 show this closed relationship.

Many changes and modifications in the above-described embodiment of the invention of course can be carried out without departing from the scope thereof. Accordingly, that scope is intended to be limited only by the scope of the appended claims.

The invention claimed is:

1. An air bag having a tri-state vent, in an initial state the vent is configured to be closed, the vent in a medial state configured to be at least partially open or fully open as the air bag is starting to inflate, permitting some inflation gas to exit through the vent and the vent in a final state configured to be at least partially closed or fully closed as the air bag continues to inflate, and wherein the vent includes a first vent opening which is located in a portion of the air bag, the vent includes a flap secured onto the air bag on one side of the first vent opening, in the initial state, the flap is configured to lie across the first vent opening to close the vent, the air bag being configured to permit pressurized gas to press upon the flap and the flap being configured to move through the first vent opening in response to this pressure to partially open or fully open the vent.

2. The air bag according to claim 1 further including a sliding member located on an interior side of the flap, the sliding member including a sliding panel movable independently of the flap, the sliding member further includes a tether, the panel is initially configured in a folded or compact configuration remote from the first vent opening so as not to impede gas flow through the first vent opening, the tether having a first end secured to the sliding panel and a second end secured to a location of the air bag that will move as the air bag inflates, the tether initially configured to lie across the first vent opening and configured to minimally restrict any gas flow across the tether and through the first vent opening.

3. The air bag according to claim 1 wherein the vent includes a tether, the tether has an end that is connected to a location of the air bag.

4. The air bag according to claim 3 wherein as the air bag inflates, the tether moves with the location of the air bag and is pulled progressively taut which aids in a change of state of the tri-state vent.

5. The air bag according to claim 3 wherein the air bag is a dual depth air bag.

6. The air bag according to claim 5 further comprises: an additional tether connected to a location of the air bag.

7. The air bag according to claim 6 wherein a remote end of the additional tether is connected to a tether release mechanism.

8. The air bag according to claim 7 wherein while the tether release mechanism maintains a hold on the additional tether, the air bag is restricted in size.

9. The air bag according to claim 7 when the tether release mechanism releases the additional tether the air bag is permitted to inflate fully to a larger size.

10. The air bag according to claim 1 further comprises a second tri-state vent at another location on the air bag.

11. An air bag having a tri-state vent, in an initial state the vent is configured to be closed, the vent in a medial state configured to be at least partially open or fully open as the air bag is starting to inflate, permitting some inflation gas to exit through the vent and the vent in a final state configured to be at least partially closed or fully closed as the air bag continues to inflate, wherein the air bag includes a panel with at least a first vent opening, a flap having a first end and a second end and a medial region therebetween, the second end secured to the air bag on a side of the first vent opening furthest away from an air bag inflator, the first end and a medial portion of the flap configured to be moved through the first vent opening by a buildup of pressure in the air bag above a first level; a protective jacket secured to an inside surface of the air bag, the jacket being larger than the first vent opening, the jacket including a second vent opening aligned with the first vent opening; a vent mechanism including a sliding member located between the flap and jacket, the sliding member including a panel and tether, the tether extending through a tether opening in the jacket and secured to a portion of the air bag, the sliding member movable in response to tension applied to the tether as the air bag inflates, the sliding member configured to be in a stored orientation away from the first vent opening and the second vent opening.

12. The air bag according to claim 11 wherein the panel of the sliding member is configured in a folded or rolled configuration on a side of the first vent opening close to the inflator, the tether extending across the first opening.

13. The air bag according to claim 11 wherein the air bag is a dual depth air bag.

14. The air bag according to claim 13 further comprises: an additional tether connected to a location of the air bag.

15. The air bag according to claim 11 wherein a remote end of an additional tether is connected to a tether release mechanism.

16. The air bag according to claim 15 wherein while the tether release mechanism maintains a hold on the additional tether, the air bag is restricted in size.

17. The air bag according to claim 15 when the tether release mechanism releases the additional tether the air bag is permitted to inflate fully to a larger size.

18. The air bag according to claim 11 further comprises a second tri-state vent at another location on the air bag.

* * * * *